US008267353B2

United States Patent
Childs

(10) Patent No.: US 8,267,353 B2
(45) Date of Patent: Sep. 18, 2012

(54) COVER PANEL FOR AN AIRCRAFT WING AND A METHOD OF FORMING THEREOF

(75) Inventor: Thomas Childs, Bristol (GB)

(73) Assignee: Airbus Operations Limited, Bristol (GB)

( * ) Notice: Subject to any disclaimer, the term of this patent is extended or adjusted under 35 U.S.C. 154(b) by 701 days.

(21) Appl. No.: 11/773,557

(22) Filed: Jul. 5, 2007

(65) Prior Publication Data

US 2008/0042011 A1    Feb. 21, 2008

(30) Foreign Application Priority Data

Aug. 16, 2006 (GB) .................................. 0616324.0

(51) Int. Cl.
*B64C 3/26* (2006.01)

(52) U.S. Cl. ..................................... 244/123.1; 244/131

(58) Field of Classification Search ............... 244/123.1, 244/123.12, 123.13, 123.3, 123.4, 129.8, 244/123.9, 131, 120, 132; 29/897.2
See application file for complete search history.

(56) References Cited

U.S. PATENT DOCUMENTS

| 2,807,437 | A | * | 9/1957 | Roush | 416/233 |
| 3,023,860 | A | * | 3/1962 | Ellzey | 244/120 |
| 3,185,267 | A | * | 5/1965 | Pavlecka | 52/281 |
| 4,457,249 | A | * | 7/1984 | Disen | 114/88 |
| 4,828,202 | A | * | 5/1989 | Jacobs et al. | 244/117 R |
| 6,328,261 | B1 | * | 12/2001 | Wollaston et al. | 244/132 |
| 6,450,394 | B1 | | 9/2002 | Wollaston et al. | |
| 6,543,721 | B2 | * | 4/2003 | Palm | 244/117 R |
| 6,581,819 | B1 | * | 6/2003 | Aota et al. | 228/112.1 |
| 7,494,092 | B2 | * | 2/2009 | Brenner et al. | 244/119 |
| 2003/0042293 | A1 | * | 3/2003 | Ezumi et al. | 228/112.1 |

FOREIGN PATENT DOCUMENTS

JP   2001-47260 A1   2/2001
WO   98/58759 A1   12/1998

OTHER PUBLICATIONS

Search Report for GB0616324.0 Dated Nov. 23, 2006.

* cited by examiner

*Primary Examiner* — Timothy D Collins
*Assistant Examiner* — Brian M O'Hara
(74) *Attorney, Agent, or Firm* — Lowe, Hauptman, Ham & Berner, LLP

(57) ABSTRACT

A wing cover panel for an aircraft wing is formed as a plurality of sections each carrying stringer sections which are then fixed together to form a wing cover panel with an integral hollow stringer.

23 Claims, 4 Drawing Sheets

COVER PANEL FOR AN AIRCRAFT WING AND A METHOD OF FORMING THEREOF

RELATED APPLICATIONS

The present application is based on, and claims priority from, Great Britain Application Number 0616324.0, filed Aug. 16, 2006, the disclosure of which is hereby incorporated by reference herein in its entirety.

FIELD OF INVENTION

The present invention relates to a cover panel for an aircraft wing and a method of forming such a cover panel.

BACKGROUND OF THE INVENTION

The core of an aircraft wing is a section called a wing box. The wing box is fared into the aircraft fuselage and runs from the root towards the tip of the wing. The wing box provides the central sections of the upper and lower aerofoil surfaces for the wing in addition to attachment points for engines and control surfaces such as ailerons, trim flaps and airbrakes. The aerofoil surfaces of the wing box are provided by panels referred to as wing cover panels. The wing covers panels have a number of structural elements called stringers attached to their inner surfaces and which run within the wing box structure from the root towards the tip. The stringers are arranged to provide the necessary structural stability and integrity to enable the wing covers to cope with the operational loads on the wing.

When building aircraft structures, one of many considerations is the balance between weight and strength. In other words, structures need to be as light as possible while providing the necessary strength and structural integrity to perform properly under operational loads. The loads on a wing vary along its span and typically reduce towards the wing tip. Therefore, stringers can be built to have strength that varies along their length, thus reducing their overall weight. Stringers are commonly created by joining or splicing stringer sections, each section having weight characteristics tailored to its expected loading. Alternatively, a single stringer can be provided and machined to a varying degree along the span so as to reduce unnecessary weight. The finished stringer is then typically fixed to the interior surface of a wing cover panel within the wing box.

A problem with splicing or joining sections of stringer is that it adds extra weight and complexity to the wing box. A problem with machining a single stringer is that the amount by which the stringer can be modified is limited by the envelope of the stringer cross section. If significant machining is desired then a larger envelope is required. This increases the cost of the stringer due to the greater the amount of waste material produced. Also, fixing a stringer to the wing cover panel requires a large number of holes to be drilled in both the stinger and wing cover for the appropriate fixing. These holes are potential crack initiation sites and the fixings themselves increase the overall weight of the wing box.

SUMMARY OF THE INVENTION

An embodiment of the invention provides a method of forming a wing cover panel for an aircraft wing, the method comprising the steps of:

a) forming a first and second cover panel sections each comprising:
a panel member having an aerofoil surface and a non aerofoil surface; and
a first flange projecting away from the non aerofoil surface in a generally radial plane towards a first edge of the first or second wing cover section; and
b) fixing the first cover panel section to the second cover panel section by joining the respective first edges of the panel members and joining a projecting edge of each of the respective flanges so as to form a wing cover panel having an integral closed section stringer.

The flange and the panel member may be integrally formed. At least one of the cover panel sections may further comprise a second flange projecting away from the non aerofoil surface in a generally radial plane towards a second edge of the first or second panel member, the second edge being generally opposite the first edge. The stringer may have a box section, each flange providing a part of the box section. At least one of the cover panel sections may be formed having the projecting edge of the flange and the first edge of the panel member lying in a plane generally perpendicular to the aerofoil surface.

At least one of the cover panel sections may be formed having the projecting edge of the flange and the first edge of the panel member lying in a radial plane relative to the aerofoil surface so that when the first and second cover panel sections are fixed together, the aerofoil surface is concave. At least one of the cover panel sections may be formed having the projecting edge of the flange and the first edge of the panel member both lying in a radial plane relative to the aerofoil surface so that when the first and second cover panel sections are fixed together, the aerofoil surface is convex. At least the first edge of the panel member and the first flange may be tapered along their length in the plane of the aerofoil surface so that when the first and second wing cover panel sections are fixed together, the stringer is correspondingly tapered in a span wise direction.

The wing cover panel sections may be extruded. The wing cover panel sections may be extruded and the tapering provided by machining the or each wing cover panel section. The first and second wing cover panel sections may be fixed together by welding. The first and second wing cover panel sections may be formed from metal or metal alloy.

Another embodiment provides a wing cover panel for an aircraft a first and second cover panel sections, each the cover panel section comprising:
a panel member having an aerofoil surface and a non aerofoil surface; and
a first flange projecting away from the non aerofoil surface in a generally radial plane towards a first edge of the first or second wing cover section, wherein
the first cover panel section is arranged to be fixed to the second cover panel section by joining the respective first edges of the panel members and joining a projecting edge of each of the respective flanges so as to form a wing cover panel having an integral closed section stringer.

A further embodiment provides a cover panel section for assembly into a wing cover panel for an aircraft, the cover panel section comprising:
a panel member having an aerofoil surface and a non aerofoil surface; and
a first flange projecting away from the non aerofoil surface in a generally radial plane towards a first edge of the cover panel section, wherein
the cover panel section is arranged to be fixed to a correspondingly formed second cover panel section by joining the first edge of the panel member to a corresponding edge of the second cover panel section and joining a projecting edge of the flange to a corresponding edge of the second cover panel section so as to form a wing cover panel having an integral closed section stringer.

BRIEF DESCRIPTION OF THE DRAWINGS

Embodiments of the invention will now be described, by way of example only, with reference to the accompanying drawings in which.

DETAILED DESCRIPTION OF EMBODIMENTS OF THE INVENTION

Figure 1:
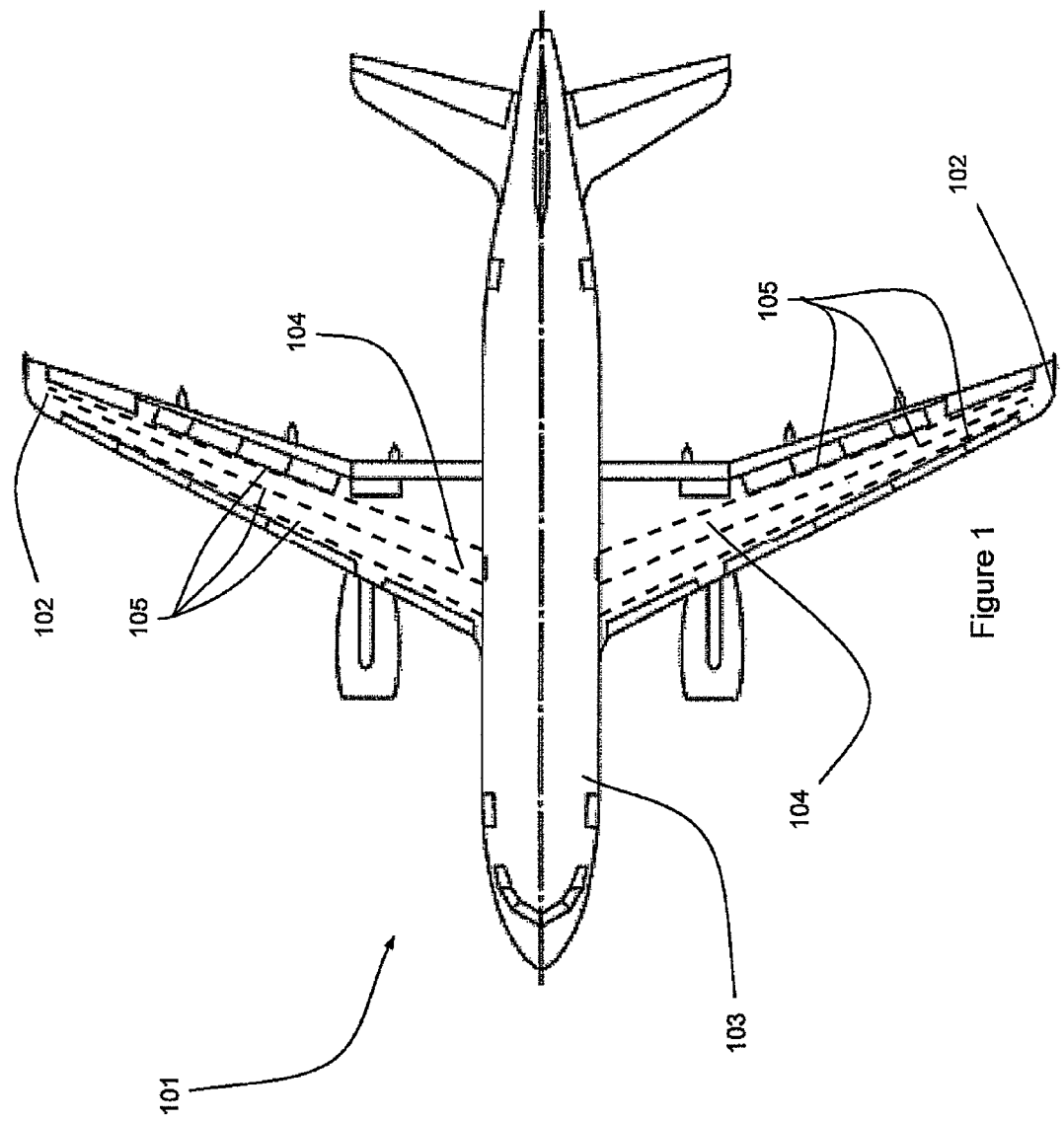
FIG. 1 is a plan view of an aircraft.

With reference to FIG. 1, an aircraft 101 comprises wings 102 attached to a fuselage 103. The wings 102 comprise a central structural element 104 in the form of a wing box. The wing box 104 runs from the root to the tip of each wing 102 and between the leading and trailing edges of the wing. The wing box 104 comprises a number of structural elements 105 in the form of stringers, which run from the root to the tip of each wing box 104.

Figure 2:
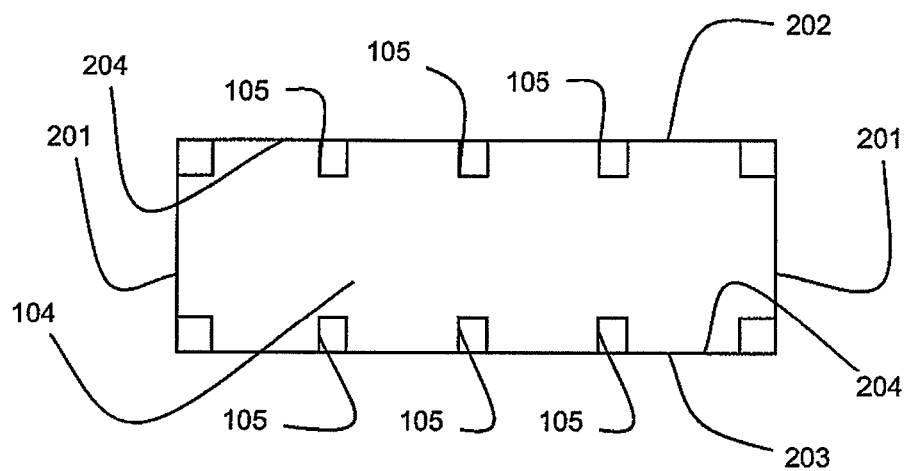
FIG. 2 is a cross-sectional view of a wing box of the aircraft of FIG. 1.

With reference to FIG. 2, the wing box 104 is constructed from two side members 201 in the form of spars, which provide attachment points for the leading and trailing edge structures (not shown) of the wing 102. The upper and lower surfaces 202, 203 of the wing box 104 are each formed from wing cover panels 204, which provide the upper and lower aerofoil surfaces of the wing 102 respectively. The stringers 105 project from the interior or non-aerofoil surface of the wing cover panels 202, 203.

Figure 3:
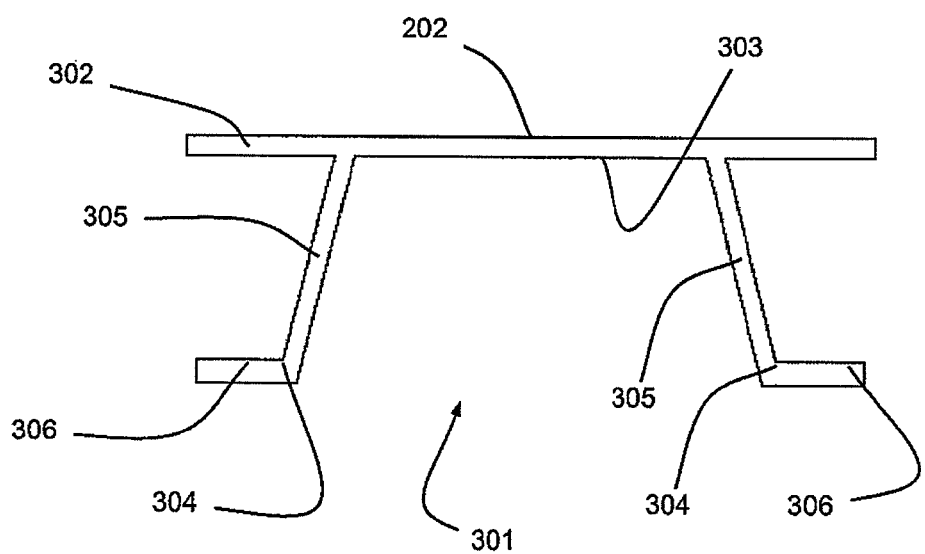
FIG. 3 is a cross-sectional view of a wing cover section for use in manufacturing wing cover panels for the wing box of FIG. 2.

With reference to FIG. 3, each wing cover panel section 301 is extruded, with a constant cross-section, from aluminium alloy. The wing cover panel section 301 comprises a panel member 302 that provides part of the upper or lower aerofoil surface 202, 203 of the wing. The panel member 302 also provides a non-aerofoil surface 303, which is internal when assembled in the wing box 104. The wing cover panel section further comprises two stringer halves, each in the form of a flange 304 formed in the non-aerofoil surface 303 and projecting away from the non-aerofoil surface 303 in a generally radial plane towards a respective edge of the panel member 302. In the present embodiment, the flanges comprise flat side panels 305 extending from the non-aerofoil surface 303 in the radial plane which each follow into crown sections 306 formed in a plane generally parallel to the aerofoil surface 202. The ends of the crown sections 306 are arranged to align with the respective edges of the panel member 302 in a plane substantially perpendicular to the aerofoil surface 202. Since the wing cover panel section 301 is extruded, the stringer halves 304 are integrally formed in the wing panel member 302.

Figure 4:
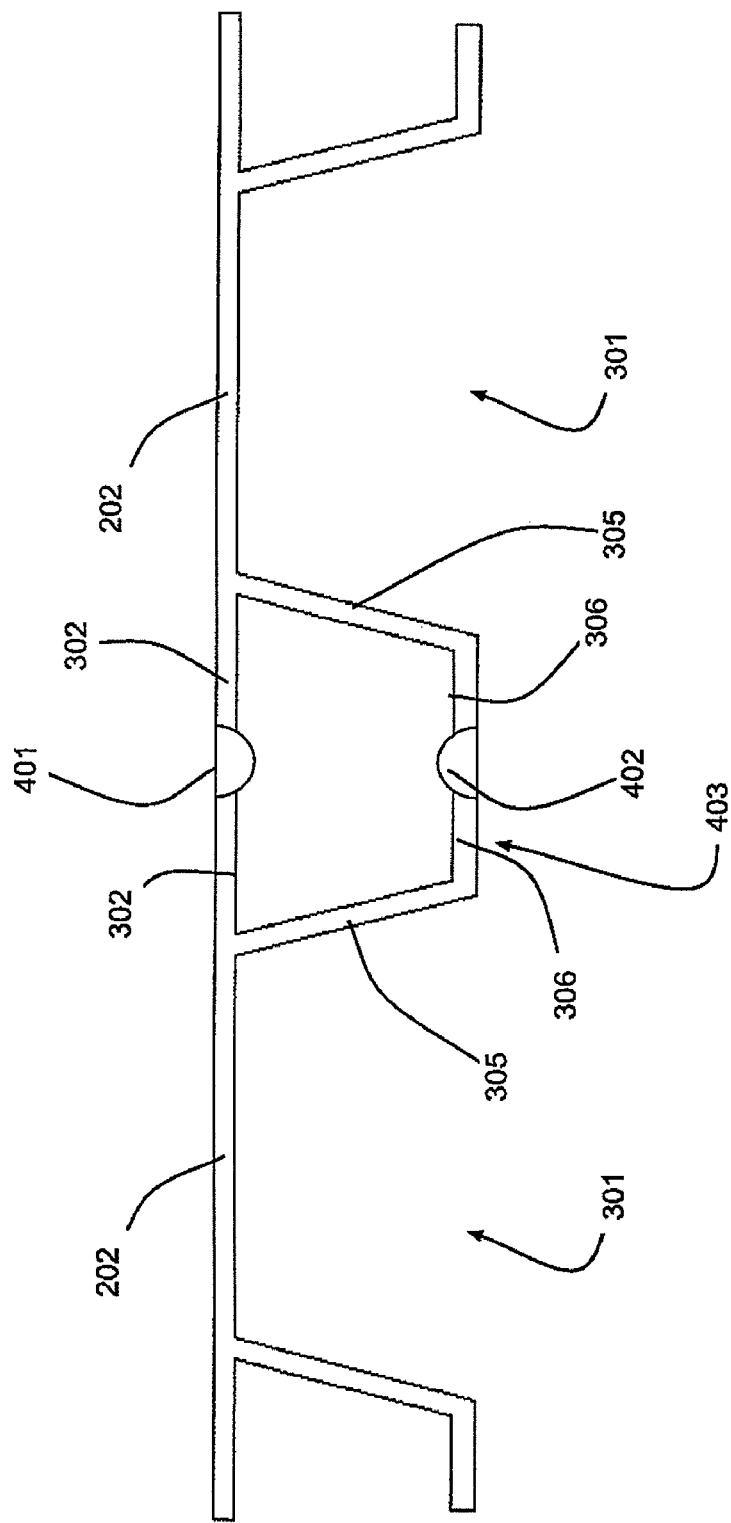
FIG. 4 shows a cross section view of a wing cover panel assembled from two of the wing cover sections of FIG. 2.

The wing cover panels 204 are assembled from two or more wing cover panels 301 as shown in FIG. 4. In the present embodiment, each wing cover panel section 301 is fixed to its neighbouring panel by welds 401, 402. The first weld 401 joins the edges of the respective panel members 302 and the second weld 402 joins the ends of the corresponding crown sections 306. The resulting wing cover panel 204 thus comprises an integral stringer 403 formed by the edge sections of the two panel members 302, the side panels 305 and the crown sections 306. The configuration of two panels 301 shown in FIG. 4, may be added to with further panel sections 301 or the otherwise unattached crown sections 306 and sides of the panel members 302 may be used to attach the assembled wing cover panel 204 to the spars 201.

Figure 5:
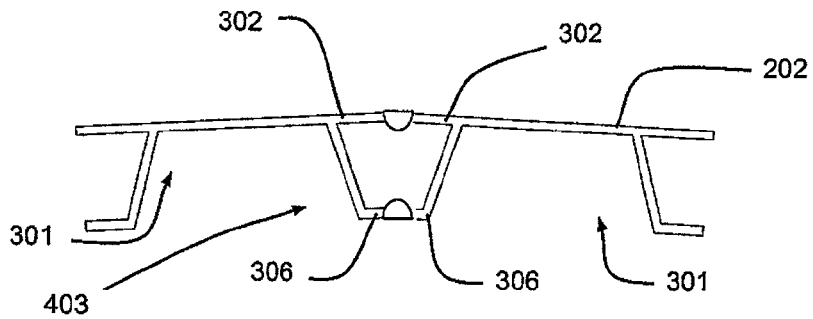
FIGS. 5 and 6 are cross sections of wing cover panels according to further embodiments.
Figure 6:
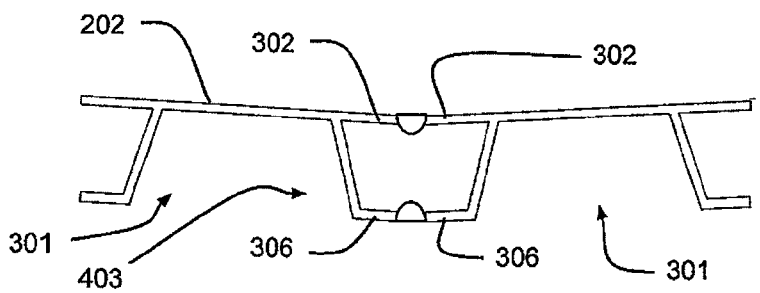

In another embodiment, with reference to FIG. 5, prior to the joining of two wing cover panel sections 301, the crown section 306 of one or both of the wing cover panel sections 301 is machined so as to reduce its length in a plane generally parallel to that of the aerofoil surface 202. Thus when the sections 301 are fixed together, their combined aerofoil surface 202 is convex. In a further embodiment, with reference to FIG. 6, the edges of the panel member 302 are machined so as to reduce their length in a plane generally parallel to that of the aerofoil surface 202. Thus when the sections 301 are fixed together, their combined aerofoil surface 202 is concave.

Figures 7, 8:
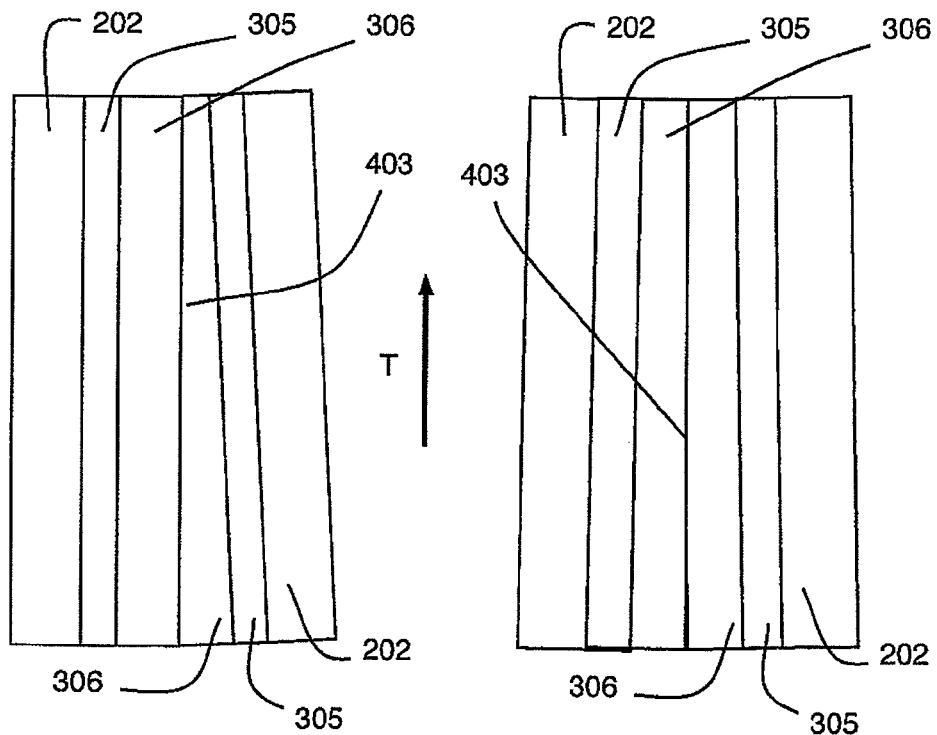
FIGS. 7 and 8 are plan views of wing cover panels according to other embodiments.

In another embodiment, with reference to FIG. 7, prior to the joining of two wing cover panel sections 301, the crown section 306 and the edge of the panel member 302 of one of the wing cover panel sections 301 is machined so as to be increasingly shortened along their length in a plane generally parallel to that of the aerofoil surface 202. Thus when the sections 301 are fixed together, the resulting wing cover panel is tapered along its length in the direction indicated by the arrow T. Furthermore, the cross section of the integral stringer 403 is also tapered in the direction T.

In a further embodiment, with reference to FIG. 8, prior to the joining of two wing cover panel sections 301, the respective crown sections 306 and the edges of the panel members 302 of both of the wing cover panel sections 301 are machined so as to be increasingly shortened along their length in a plane generally parallel to that of the aerofoil surface 202. Thus when the sections 301 are fixed together, the resulting wing cover panel is further tapered along its length in the direction indicated by the arrow T and the cross section of the integral stringer 403 is also further tapered in the direction T.

In another embodiment, the features of the embodiments described above with reference to FIG. 5 or 6 and FIG. 7 or 8 are combined to provide a tapered wing cover panel and integral stringer in combination with either a convex or concave aerofoil surface.

In a further embodiment, a wing cover panel section is formed with only one flange providing an integral stringer half. The opposing edge can then be conventionally fixed to the wing box. Such a wing cover panel may be combined with corresponding second panel to provide a wing cover panel with a single integral stringer suitable for convention fixing to a wing box. In another embodiment, a pair of such single flanged wing cover sections may be joined via any number of two flanged wing cover panel sections, each providing an additional two sections of integral stringers and thus adding a further stringer to the finished wing cover panel.

In a further embodiment, the flanges are arranged to provide an integral stringer having a cross section other than a box cross-section. For example, the cross-section may be triangular or semicircular or other suitable section. Furthermore, the cross section of the integral stringer may be asymmetrical. The cross section of the integral stringer may be wholly formed with one panel member so as to provide a one flange wing cover panel section that provides a whole integral stringer. In another embodiment, the aerofoil surface of the wing cover panel is arranged to be convex or concave as described above with reference to FIG. 5 or 6 and instead of the wing cover panel sections being machined, they are formed with suitably dimensioned joining points so as to provide the desired curve to the aerofoil surface.

As will be understood by those skilled in the art, the relative configurations of the flanges, each side panel and crown section may be varied to suit the particular application of a given integral stringer. For example, where two side panels are provided in the stringer cross section, these may be arranged in converging, diverging or parallel planes relative to each other, depending on their particular application. Furthermore, machining of the stringer blank may be carried out by any suitable process such as milling, etching, abrading, punching, routing or drilling. Furthermore, the stringers may be formed from any suitable material such as a metal, metal alloy or other suitable non-metallic material.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:

1. A method of forming a single skin wing cover panel for an aircraft wing, said method comprising the steps of:
   a) forming first and second single skin cover panel sections each comprising:
   a single skin panel member having a first edge, an aerofoil surface on one side, and a non aerofoil surface on the other side; and
   a first flange projecting away from said non aerofoil surface and having a projecting edge in a generally parallel plane relative to said first edge, wherein said first and said projecting edges are disposed in a same plane;
   b) tapering said first edge of said single skin panel member and said projecting edge of said first flange of at least one of said single skin cover panel sections in a spanwise direction; and,
   c) fixing said first single skin cover panel section to said second single skin cover panel section by joining said respective first edges of said first and said second single skin panel members and joining said projecting edges of said respective first flanges of said first and said second single skin cover panel sections so as to form a single skin wing cover panel having a single integral stringer having a closed and hollow cross-section tapered in the spanwise direction.

2. A method according to claim 1 in which said first flange and said respective single skin panel member are integrally formed.

3. A method according to claim 1 in which at least one of said single skin cover panel sections further comprises a second flange projecting away from said non aerofoil surface in a generally parallel plane relative to a second edge of said respective single skin panel member, said second edge being generally opposite said first edge.

4. A method according to claim 1 in which said stringer has a box cross-section, each said first flange providing a part of said box cross-section.

5. A method according to claim 1 in which at least one of said single skin cover panel sections is formed having said projecting edge of said first flange and said first edge of said single skin panel member lying in a plane generally perpendicular to said respective aerofoil surface.

6. A method according to claim 1 in which at least one of said single skin cover panel sections is formed having said projecting edge of said first flange and said first edge of said single skin panel member lying in a radial plane relative to said respective aerofoil surface so that when said first and second single skin cover panel sections are fixed together, a combined aerofoil surface defined by said aerofoil surfaces of said single skin cover panel sections is concave.

7. A method according to claim 1 in which at least one of said single skin cover panel sections is formed having said projecting edge of said first flange and said first edge of said single skin panel member both lying in a radial plane relative to said respective aerofoil surface so that when said first and second single skin cover panel sections are fixed together, a combined aerofoil surface defined by said aerofoil surfaces of said single skin cover panel sections is convex.

8. A method according to claim 1 in which said single skin wing cover panel sections are extruded.

9. A method according to claim 1 in which said single skin wing cover panel sections are extruded and said tapering is provided by machining said at least one single skin wing cover panel section.

10. A method according to claim 1 in which said first and second single skin wing cover panel sections are fixed together by welding.

11. A method according to claim 1 in which said first and second single skin wing cover panel sections are formed from metal or metal alloy.

12. A single skin wing cover panel for an aircraft, said single skin wing cover panel comprising first and second single skin cover panel sections, each said single skin cover panel section comprising:
   a single skin panel member having a first edge, an aerofoil surface on one side, and a non aerofoil surface on the other side; and
   a first flange projecting away from said non aerofoil surface and having a projecting edge in a generally parallel plane relative to said first edge, wherein said first and said projecting edges are disposed in a same plane;
   wherein
   said first edge of said single skin panel member and said projecting edge of said first flange of at least one of said skin cover panel sections are tapered in a spanwise direction,
   said respective first edges of said first and said second single skin panel members are joined together, and said projecting edges of said respective first flanges of said first and said second single skin cover panel sections are joined together so as to form said single skin wing cover panel having a single integral stringer having a closed and hollow cross-section tapered in the spanwise direction.

13. A single skin wing cover panel according to claim 12 in which said first flange and said respective single skin panel member are integrally formed.

14. A single skin wing cover panel according claim 12 in which at least one of said single skin cover panel sections further comprises a second flange projecting away from said non aerofoil surface in a generally parallel plane relative to a second edge of said respective single skin panel member, said second edge being generally opposite said first edge.

15. A single skin wing cover panel according to claim 12 in which said stringer has a box cross-section, each said first flange providing a part of said box cross-section.

16. A single skin wing cover panel according to claim 12 in which at least one of said single skin cover panel sections is formed having said projecting edge of said first flange and said first edge of said single skin panel member lying in a plane generally perpendicular to said respective aerofoil surface.

17. A single skin wing cover panel according to claim 12 in which at least one of said single skin cover panel sections is formed having said projecting edge of said first flange and said first edge of said single skin panel member lying in a radial plane relative to said respective aerofoil surface so that when said first and second single skin cover panel sections are fixed together, a combined aerofoil surface defined by said aerofoil surfaces of said single skin cover panel sections is concave.

18. A single skin wing cover panel according to claim 12 in which at least one of said single skin cover panel sections is formed having said projecting edge of said first flange and said first edge of said single skin panel member both lying in a radial plane relative to said respective aerofoil surface so that when said first and second single skin cover panel sections are fixed together, a combined aerofoil surface defined by said aerofoil surfaces of said single skin cover panel sections is convex.

19. A single skin wing cover panel according to claim 12 in which said single skin wing cover panel sections are extruded.

20. A single skin wing cover panel according to claim 12 in which said single skin wing cover panel sections are extruded and said tapering is provided by machining said at least one single skin wing cover panel section.

21. A single skin wing cover panel according to claim 12 in which said first and second single skin wing cover panel sections are fixed together by welding.

22. A single skin wing cover panel according to claim 12 in which said first and second single skin wing cover panel sections are formed from metal or metal alloy.

23. A single skin cover panel section for assembly into a single skin wing cover panel for an aircraft, said single skin cover panel section comprising:
- a single skin panel member having a first edge, an aerofoil surface on one side, and a non aerofoil surface on the other side; and
- a first flange projecting away from said non aerofoil surface and having a projecting edge in a generally parallel plane relative to said first edge, wherein said first and said projecting edges are disposed in a same plane, wherein said first edge of said single skin panel member and said projecting edge of said first flange of at least one of said skin cover panel sections are tapered in a spanwise direction, said single skin cover panel section is arranged to be fixed to a correspondingly formed second single skin cover panel section by joining said first edge of said single skin panel member to a corresponding edge of said second single skin cover panel section and joining a projecting edge of said first flange to a corresponding edge of said second single skin cover panel section so as to form a single skin wing cover panel having a single integral stringer having a closed and hollow cross-section tapered in the spanwise direction.

\* \* \* \* \*